United States Patent [19]
Caswell et al.

[11] Patent Number: 5,546,448
[45] Date of Patent: Aug. 13, 1996

[54] APPARATUS AND METHOD FOR A CALLER ID MODEM INTERFACE

[75] Inventors: Ty J. Caswell, Big Lake; Jeffrey P. Davis, Ham Lake; Gregory R. Johnson, New Brighton; Timothy J. Reinarts, Ramsey; Ting Sun, Minneapolis, all of Minn.

[73] Assignee: Multi-Tech Systems, Inc., Mounds View, Minn.

[21] Appl. No.: 337,292

[22] Filed: Nov. 10, 1994

[51] Int. Cl.⁶ .......................... H04M 1/56; H04M 15/00; H04M 11/00
[52] U.S. Cl. .................. 379/142; 379/95; 379/96
[58] Field of Search .................. 379/142, 127, 379/130, 93, 95, 94, 96, 97, 98, 100

[56] References Cited

U.S. PATENT DOCUMENTS

| | | |
|---|---|---|
| 3,904,830 | 9/1975 | Every, Sr. et al. |
| 3,997,732 | 12/1976 | Every, Sr. et al. |
| 4,531,023 | 7/1985 | Levine ............................. 379/95 X |
| 4,740,963 | 4/1988 | Eckley ............................. 370/110.1 |
| 4,965,789 | 10/1990 | Bottau et al. ....................... 370/79 |
| 5,054,055 | 10/1991 | Hanle et al. ....................... 379/142 |
| 5,206,900 | 4/1993 | Callele ............................. 379/142 |
| 5,301,246 | 4/1994 | Archibald et al. ................... 379/95 X |
| 5,371,853 | 12/1994 | Kao et al. ......................... 395/2.32 |
| 5,377,260 | 12/1994 | Long ............................... 375/95 |
| 5,388,150 | 2/1995 | Schneyer et al. .................... 379/67 |
| 5,414,796 | 5/1995 | Jacobs ............................. 395/2.3 |
| 5,425,089 | 6/1995 | Chan et al. ........................ 379/183 |

FOREIGN PATENT DOCUMENTS

488865A2  6/1992  European Pat. Off.

OTHER PUBLICATIONS

European Search Report for Application No. EP 93403164 completed on Sep. 21, 1995 by Examiner Lambley; 4 pages.

S. Casale et al., "Statistical Voice/High-Speed Data Multiplexing on a 64 KBIT/S Channel," *IEEE*, pp. 459–464, dated 1991.

T. Komiya et al, "An Approach to the Multifunction Graphic Terminal for the ISDN Environment", *IEEE* pp. 32–36, dated 1988.

D. Gulick et al., "Interface for the ISDN to Your PC with A Voice/Data Board", *Electronic Design*, pp. 85–88, dated Dec. 10, 1987.

S. Sasaki et al., "Variable Rate Voice Coding System", *IEEE*, pp. 364–367, dated 1992.

U.S. West Caller ID publication, received Jul. 18, 1994, one page.

"Mitel MT8841 Calling Number Identification Circuit", *Mitel Microelectronics Digital/Analog Communications Handbook*, Doc. No. 9161-952-007-NA, Issue 9, table of contents and pp. 8–93 thru 8–102 (1993).

"Applications of the MT8841 Calling Number Identification Circuit", *Mitel Microelectronics Digital/Analog Communications Handbook*, Doc. No. 9161-001-060-NA, Issue 1, pp. 12–299 thru 12–307 (1993).

*Primary Examiner*—Wellington Chin
*Assistant Examiner*—Paul Loomis
*Attorney, Agent, or Firm*—Schwegman, Lundberg, Woessner & Kluth, P.A.

[57] ABSTRACT

An interface for modems is described which provides rapid identification of a caller and limited access based on a variety of parameters obtained from caller identification information encoded by the telephone company. The incoming telephone call information is compared to a preprogrammed access matrix to determine if the caller is authorized to access the modem connected to the interface. A telephone call screening method and apparatus which incorporates the encoded caller identification is also described. Finally, a method and apparatus for a telephone database for statistical accounting is described.

17 Claims, 13 Drawing Sheets

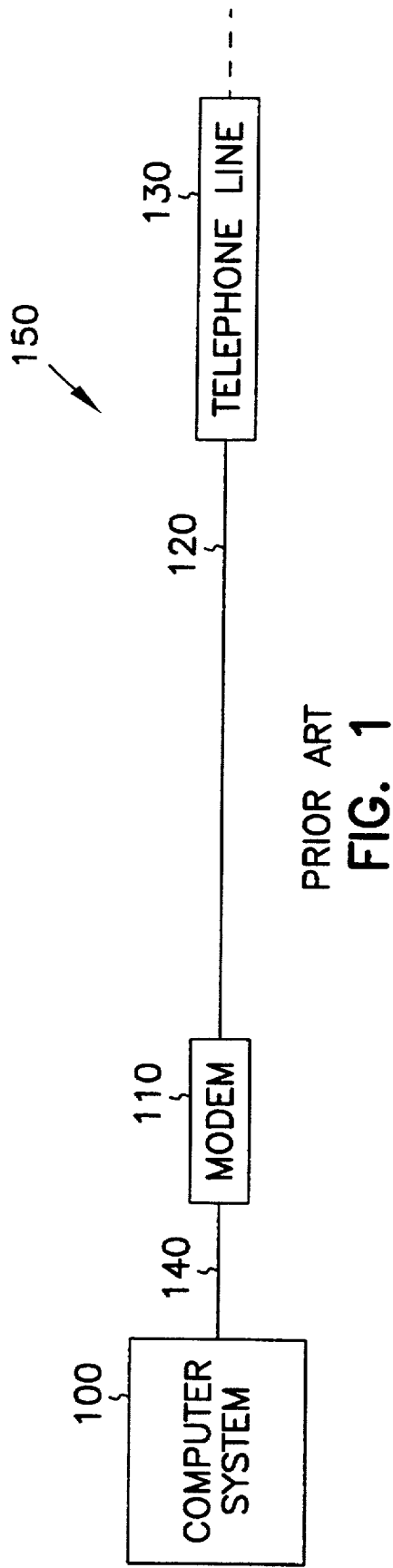
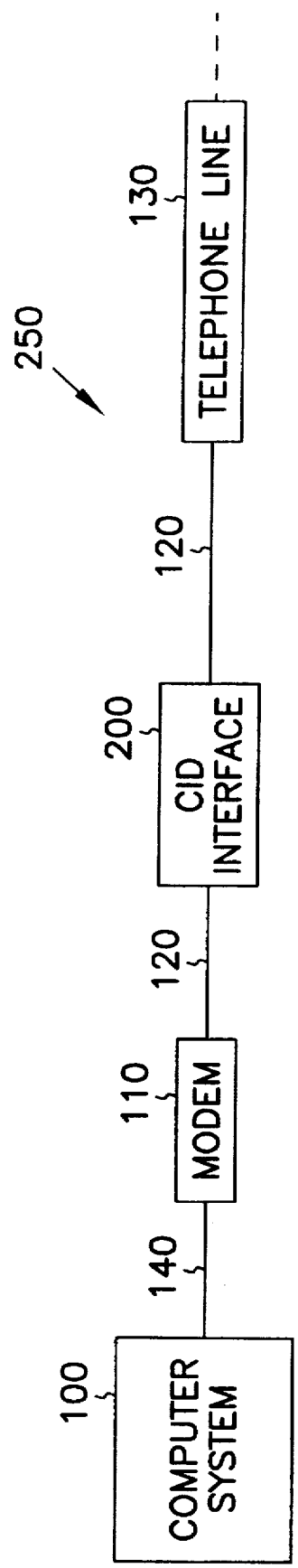
PRIOR ART
FIG. 1
FIG. 2

APPARATUS AND METHOD FOR A CALLER ID MODEM INTERFACE

FIELD OF THE INVENTION

The present invention relates to data communication modems and in particular to an access control and database creation interface for modems using caller identification information.

BACKGROUND OF THE INVENTION

Modern computer systems rely on data modems and standard telephone services for remote transfer of digital information. Modems are used for accessing bulletin board services (BBSs), computers, and computer networks. Modems are also usetiff for automated banking and credit card transactions.

FIG. 1 shows a prior art modem installation 150 wherein a modem 110 is colocated with a computer system 100 and connected to a standard telephone service 130 via telephone cable 120. Modem 110 may be located internally or externally to computer system 100. Connection 140 is through the backplane of computer system 100 if modem 110 is internally connected and connection 140 is a cable if modem 110 is externally connected. Computer system 100 may be a personal computer, a network of computers, mainframe, or other specialized computing hardware.

Modem installation 150 is a common prior art configuration and may be used to provide communications such as BBS, automated banking and credit card transactions, and remote network access.

Typically, automated transaction services and BBSs carefully monitor system access for accounting purposes and for system access management. Often, these services will accommodate several transactions throughout the business day, so it is essential that the acquisition of access information is accomplished in the shortest time possible.

The increased accessibility provided by telephone services and modems raises problems for controlling access to computer systems. For instance, BBSs, computers and computer networks are often protected by security systems to control the users on the system. Prior art modem security systems require a series of user names and passwords to gain access to the secure computer system. A common problem is that computer "hackers" have instant access to any modem connected to a standard telephone service by simply dialing the telephone number. Given such access a clever hacker can bypass even the most sophisticated modem security programs by a repeated series of attempted log-ons, using different passwords in hope of randomly entering a valid user number and password.

Systems which restrict access by limiting the number of attempted accesses in a given time period or by limiting the number of attempted accesses for a given user name enable unauthorized users to "tie up" the system while they attempt to gain unauthorized access. When the system is tied up, authorized users may be prohibited from accessing the system due to repeated unsuccessful attempts by unauthorized users. In addition, such systems fail to guarantee that the unauthorized user will not gain access by guessing a correct user name and password.

Another problem is controlling the use of public BBSs which are intended for general use. Often, access must be freely allowed to facilitate new users of the bulletin board, but problems occur when attempting to screen out nuisance callers or users which abuse the BBS services. In attempting to address these problems, many BBSs have adopted a practice of assigning a password to each new user to track BBS use and access, however, persistent users can take on a new identity each time they call the bulletin board, thereby frustrating any attempts at screening their use of the BBS.

Yet another problem is gracefully restricting access to a modem connected device depending on the date or time of day. For example, the system operator of a BBS might want to restrict modem communications with the BBS between the hours of 8:00 a.m. and 6:00 p.m. to leave time for system maintenance duties.

Therefore, there is a need in the art for a system for rapid database creation of modem transactions. There is also a need in the art for a modem access control system which quickly rejects unauthorized users, and, preferably denies access between the unauthorized user has an opportunity to illegally enter the system. There is yet a further need for a modem access control system which screens callers without the use of a password system. Finally, there is a need in the art for a telephone modem system which screens calls based on date and time.

SUMMARY OF THE INVENTION

The present invention solves the aforementioned deficiencies of the prior art and solves other problems that will be understood and appreciated by those skilled in the art upon reading and understanding the present specification.

The present disclosure describes a system for telephone call database creation and modem access control using a caller ID interface ("CID interface"). Many standard telephone carriers are encoding caller ID information which may be received before answering the telephone. One embodiment of the present invention decodes the incoming caller ID information and compares the present caller's identification information with a preprogrammed access matrix to determine if access to the modem is appropriate. The callers' identification information can be recorded and statistically tracked regardless of whether the callers are authorized and regardless of whether each call is answered.

In one embodiment of the present invention, the caller ID interface incorporates a ring detector, quick hang circuit, pass through circuit, caller ID decoder, in-use detect circuit, memory, and processor. The ring detector circuit is used to enable the caller ID decoder after the first ring, since most caller ID carriers encode the caller ID information using frequency shift keying transmission after the first telephone ring and before the second telephone ring. The caller ID decoder is connected via the pass through circuit between the first and second telephone ring to receive the incoming caller ID information. The quick hang circuit is used to hang up on an unwanted caller before actually answering the telephone, and the in-use detect signals when the line is in use during an authorized access.

In another embodiment of the present invention, the caller ID interface incorporates a ring detector, off-hook circuit, relay switching circuit, caller ID decoder, memory and a processor to convert modem electronics into a modem with caller ID interface. The relay switching circuit is used to present caller ID information to the caller ID decoder without answering the call. If the caller is authorized access, the relay switching circuit allows the off-hook circuit and dc holding circuit to maintain the connection and routes the subsequent modem data to the modem electronics.

In one embodiment of the present invention the caller ID interface acquires information about incoming calls by decoding the incoming caller ID information and storing it in memory. Statistical tracking of callers is performed on the stored caller ID information if desired by the modem owner. Another embodiment of the present invention screens modem access by comparing a preprogrammed access matrix to details of the call such as the caller's name, caller's phone number, the time and date the call is made, and the number of previous accesses by that caller in a predefined time frame. A variety of preprogrammed criteria are utilized to control access to the modem. For example, in one embodiment, screening by name and telephone number is performed on an inclusive (or exclusive) basis by preprogramming the caller ID interface with the names or telephone numbers of the callers with (or without) access privileges. The incoming call details obtained from the caller ID information are then compared to the inclusive (or exclusive) caller list to determine if the callers are authorized to access the modem. In an alternate embodiment of the present invention the caller ID interface hangs up on an unauthorized caller, preventing the unauthorized caller even brief access to the modem.

In one embodiment of the present invention, a caller ID interface is an external in-line device for preexisting modems. In an alternate embodiment the caller ID interface is internal to the modem for caller ID access control. Other embodiments incorporate a plurality of caller ID interfaces for a plurality of modems wherein each caller ID interface is uniformly or independently programmed. Yet another embodiment incorporates computer control and statistical reporting of each caller ID interface to provide centralized management and database construction for a plurality of modems.

Therefore, the present invention solves the deficiencies of the prior art by providing an apparatus and method for rapid database creation of incoming calls using caller ID information. One embodiment of the present invention also quickly rejects unauthorized callers, and may hang up on them instantly, rather than allow any access to the modem. The screening process of the present invention need not use a password for caller authorization, since the caller ID information can be used to screen out unwanted callers. Yet another embodiment of the present invention screens incoming calls based on date and time.

BRIEF DESCRIPTION OF THE DRAWINGS

In the drawings, where like numerals describe like components throughout the several views:

FIG. 1 is a general block diagram showing a prior art connection between a computer system and a standard telephone line service via a prior art modem;

FIG. 2 is a general block diagram showing one embodiment of the present invention which connects a modem to a standard telephone line service having caller ID encoded signals;

DETAILED DESCRIPTION OF THE PRESENT INVENTION

Figure 3:
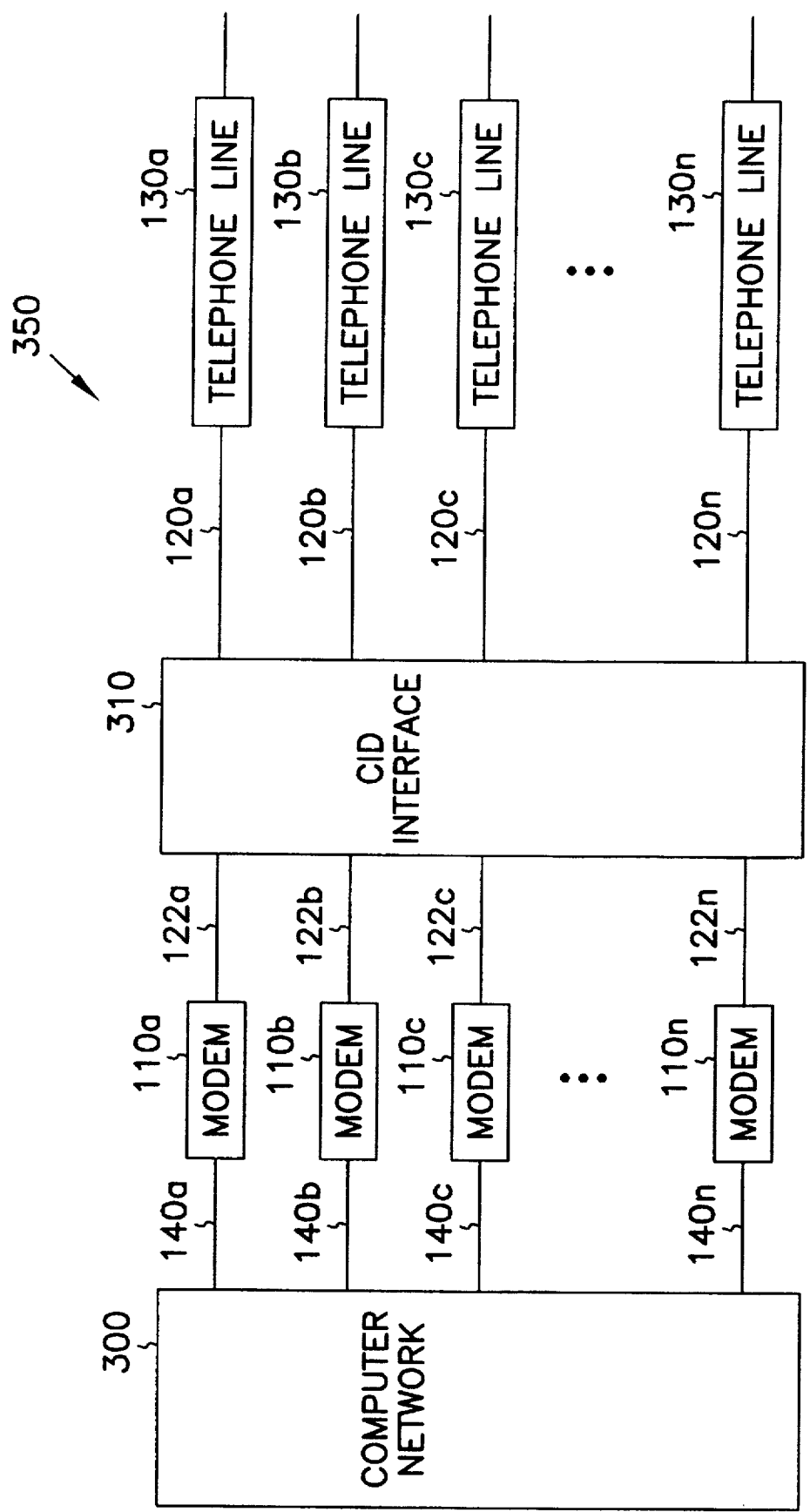
FIG. 3 is a general block diagram of one embodiment of the present invention which connects a plurality of modems to a plurality of standard telephone line services.

In the following detailed description, references made to the accompanying drawings which form a part hereof and in which is shown by way of illustration specific embodiment in which the invention may be practiced. These embodiments are described in sufficient detail to enable those skilled in the art to practice and use the invention, and it is to be understood that other embodiments may be utilized in that electrical, logical, and structural changes may be made without departing from the spirit and scope of the present invention. The following detailed description is, therefore, not to be taken in a limiting sense in scope of the present invention as defined by the appended claims.

An External Caller ID Interface

FIG. 2 shows one embodiment of the present invention in which an external caller ID interface 200 is inserted between modem 110 and standard telephone line service 130 using telephone cables 120. In this embodiment of the present invention, external caller ID interface 200 may be used to provide caller ID functionality to standard modems 110. Modem 110 is connected to computer system 100 over cable 140, however, modem 110 may be located either externally or internally to computer system 100 without affecting the operation of the present invention.

FIG. 3 shows another embodiment of the present invention in which external caller ID interface 310 services a plurality of modems 110a–110n in order to connect a plurality of standard telephone line services 130a–130n to computer network 300. Computer network 300 is any digital hardware requiring a plurality of communication ports, including but not limited to a plurality of individual personal computers, a plurality of LAN-connected (local area network) computers, or a plurality of ports to a mainframe computer.

Figure 4:
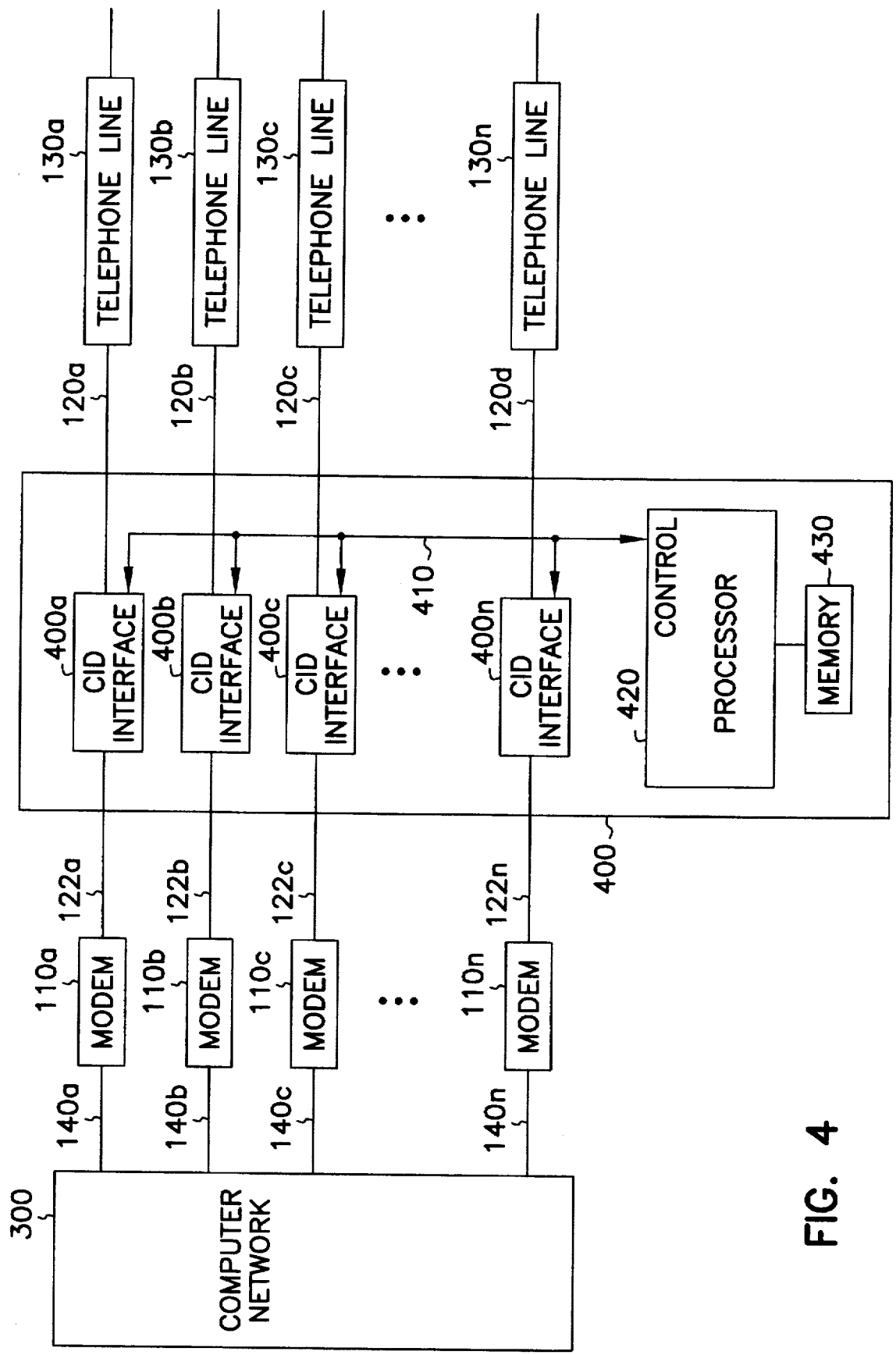
FIG. 4 is a general block diagram showing one embodiment of the present invention which connects a plurality of computer network modems to a plurality of standard telephone line services.

FIG. 4 shows yet another embodiment of the present invention an external caller ID interface 400 comprising a plurality of individual external caller ID interfaces 400a–400n for interconnecting standard telephone line services 130a–130n to modems 110a–110n. In one embodiment, external caller ID interface 400 also features a processor interface 410 and processor 420 for programming and communicating with the plurality of external caller ID interfaces 400a–400n. Processor 420 is connected to memory 430, which is programmed with an access matrix containing all of the access parameters necessary to define an authorized caller. Processor 420 is also programmable to enable independent or identical initialization of each caller ID interface 400a–400n. Therefore, depending on the programming of processor 420, memory 430 may contain an independent access matrix for each modem 400a–400n, or a single access matrix for each modem 400a–400n. In an alternate embodiment memory 430 is located inside each modem 400a–400n. In yet another alternate embodiment, each modem 400a–400n has its own processor 420a–420n and memory 430a–430n. In another embodiment, processor 420 constructs a database of the incoming telephone calls to modems 400a–400n including telephone number, telephone owner's name, time of day, and date.

Figure 5:
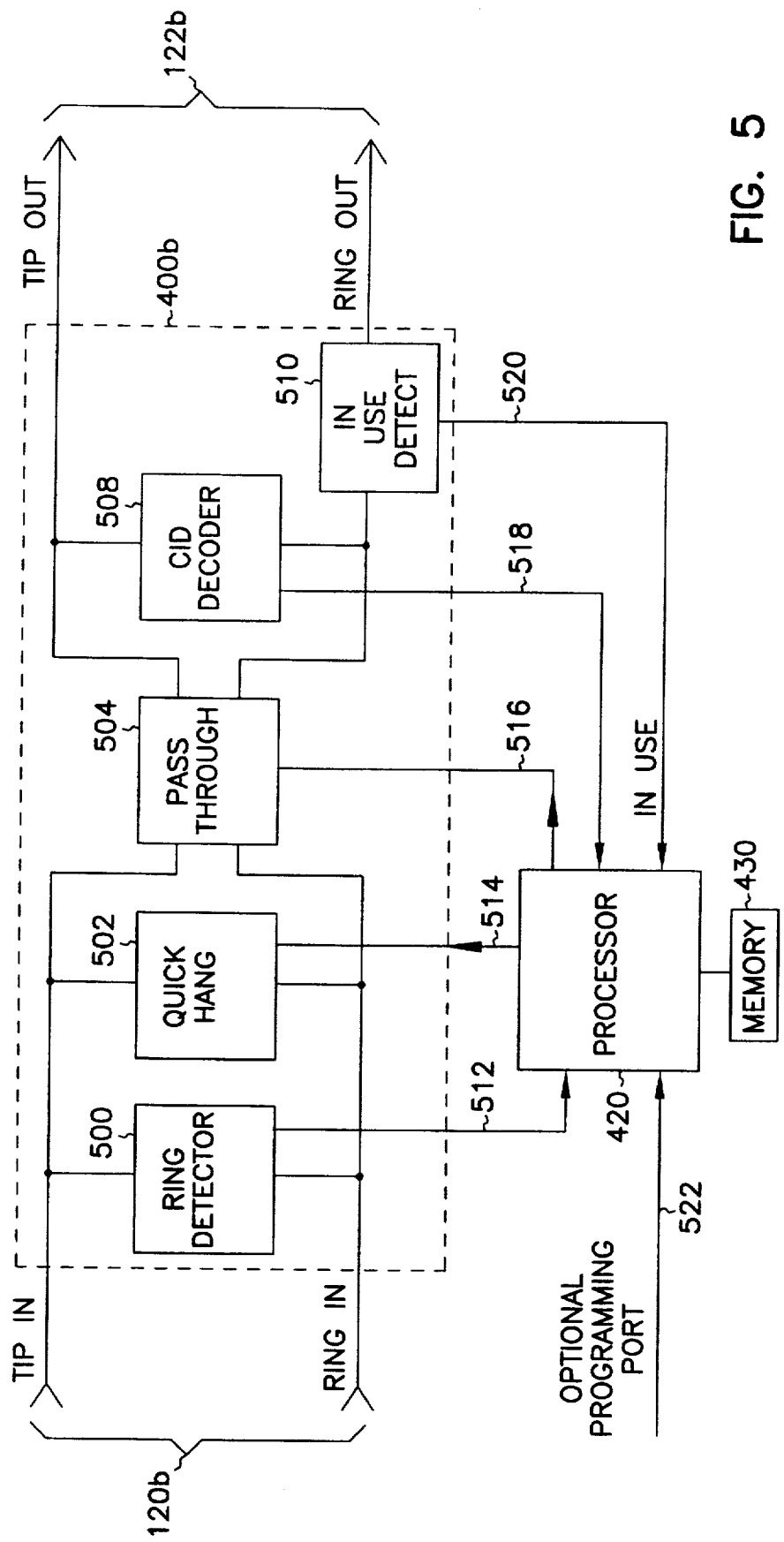
FIG. 5 is a general block diagram of one embodiment of a caller ID interface.

FIG. 5 shows one embodiment of an external caller ID interface 400b. (Caller ID interface 400b was arbitrarily selected from the n caller ID interfaces of FIG. 4.) Ring detector 500 detects telephone rings arriving from standard telephone line service 130b (not shown) through telephone line 120b and signals processor 420 on signal line 512. Upon ring detected, processor 420 signals pass through circuit 504 using signal line 516 in order for caller ID decoder 508 to decode the incoming caller ID information from telephone line 120b. Caller ID decoder 508, in conjunction with processor 420, determines if the incoming call is an authorized call. If the call is authorized, the in-use detect circuit 510 is enabled. If the call is unauthorized, the telephone line may be hung up by processor 422 using signal line 514 to quick hang circuit 502. Remote input 522 is an optional input to allow remote control and programming of external caller ID interface 400b. One embodiment of the present invention uses a standard RS-232 protocol and a dedicated computer to program caller ID interface 400b via remote input 522. An alternate embodiment employs modified caller ID decoder circuitry 508 and escape sequences to program the interface from modem 110b and computer network 300. This is accomplished by decoding a predetermined escape sequence emanating from computer network 300 to program the caller ID interface 400b.

Figure 6:
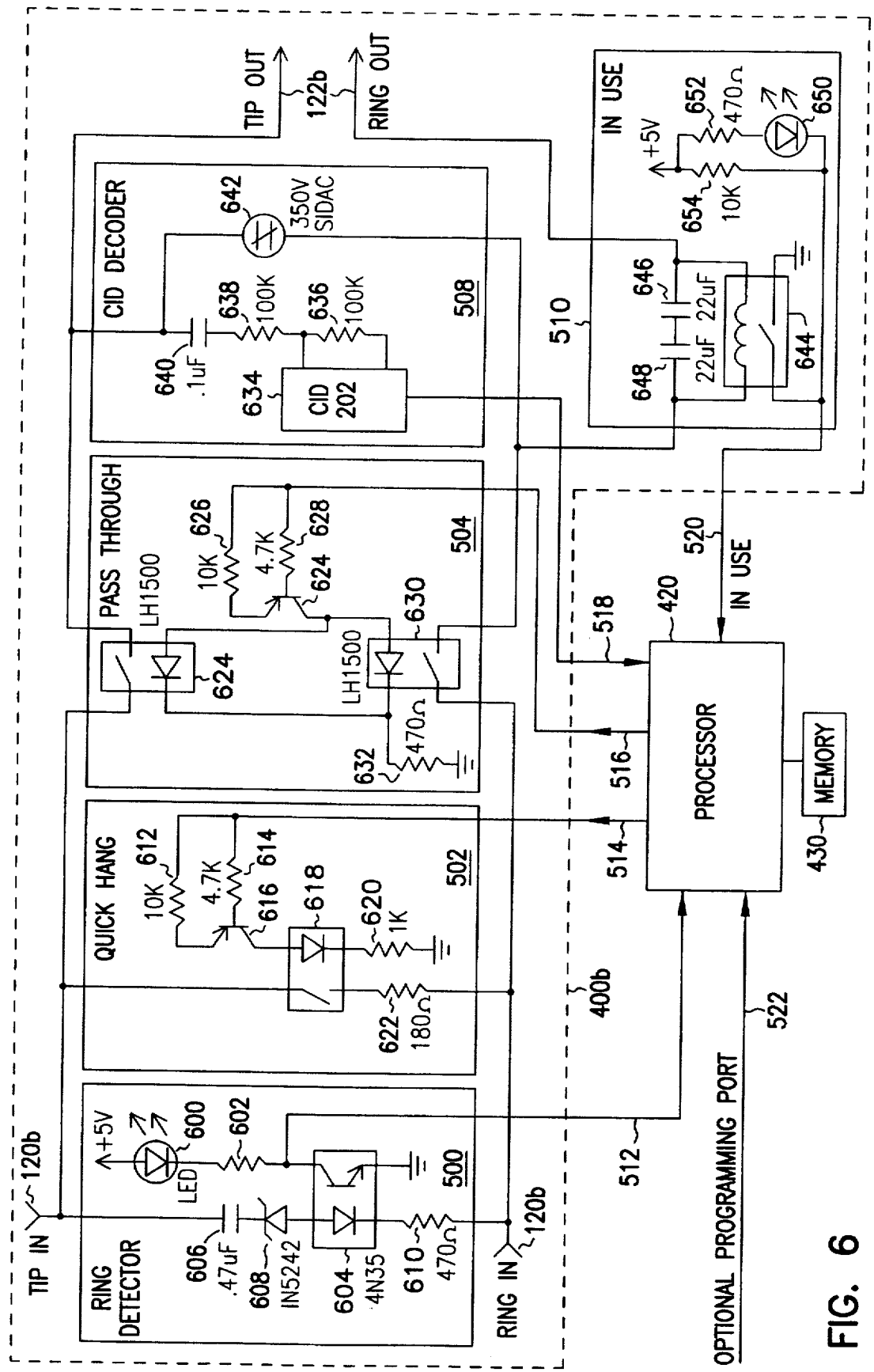
FIG. 6 is a schematic diagram of one embodiment of a caller ID interface.

FIG. 6 is a schematic diagram of external caller ID interface 400b, showing circuit realizations for the circuit blocks given in FIG. 5. Upon a ring signal applied to telephone line 120b, capacitor 606, diode 608, optoisolator 604, and resistor 610 provide a low active signal 512 to processor 420 and trigger LED 600 using resistor 602 and optoisolator 604 to indicate that a caller is calling. Processor 420 detects the ring and enables pass through circuit 504 via signal 516. Activation of signal 516 causes transistor 627 to conduct and closes switches 624 and 630 to complete the pass through circuit. Resistors 632, 626, and 628 facilitate the switching of transistor 627.

Once the pass through circuit has connected the telephone signal from telephone line 120b to caller ID module 508, the caller ID chip 634, in conjunction with resistor 636, resistor 638, capacitor 640, and sidactor 642, decodes the incoming caller ID frequency shift keyed information. The caller ID information is transferred to processor 420 over signal line 518 to determine if the incoming call is authorized using the preprogrammed access matrix resident in memory circuit 430.

If the incoming call is not authorized, quick hang circuit 502 may be activated to hang up on the unwanted caller. By asserting signal line 514, transistor 616, with the assistance of resistors 612 and 614, will conduct through switch 618 and resistor 620 to close switch 618 and hang up telephone line 120b through a 180 ohm resistor (resistor 622).

If the call is authorized, in use circuit 510 will detect the off hook condition. Relay 644 closes when energized for a sufficient time from pass through circuit 504 and activates in use signal 520 using resistor 654. LED 650 is also energized via a 5-volt supply and resistor 652.

In one embodiment, caller ID chip 634 is the Mitel MT8841 Calling Number Identification Circuit as specified in the Mitel Microelectronics Digital/Analog Communications Handbook, Doc. No. 9161-952-007-NA, issue 9 (1993), which is hereby incorporated by reference. Those skilled in the art will readily recognize that other caller ID decoding circuits may be used without departing from the scope and spirit of the present invention.

In one embodiment of the present invention processor 420 is the Zilog Z182 Microprocessor as specified in the Z180 Family Microprocessors and Peripherals Databook, Doc No. Q2/94 DC 8322-00, which is hereby incorporated by reference. Those skilled in the art will readily recognize that other processors may be used without departing from the scope and spirit of the present invention.

Alternate embodiments may use sophisticated, multifunction decoding devices and data pumps to perform the functions of caller ID chip 634. Additionally, processor 420 may be replaced with combinational logic to control the operation of the caller ID interface.

An Internal Caller ID Interface

Figure 7:
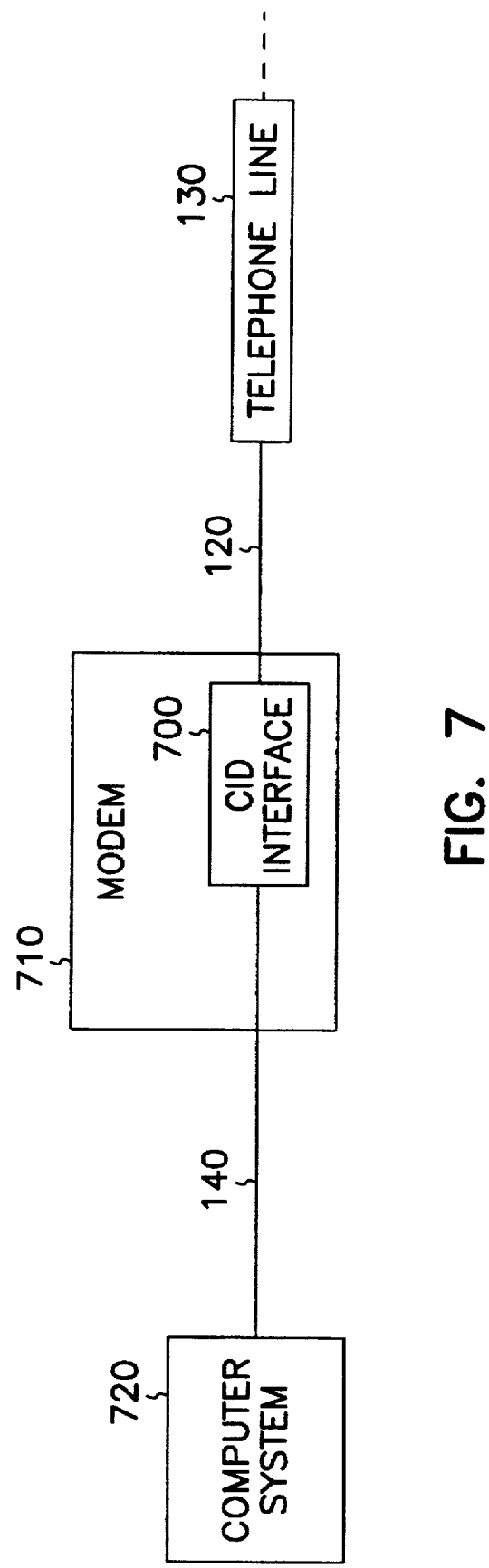
FIG. 7 is a general block diagram of one embodiment of the present invention showing a modem with an internal caller ID interface which connects a computer system to a standard telephone line service.

FIG. 7 shows one embodiment of an internal caller ID interface 700 in data modem 710, which interconnects standard telephone line service 130 to computer system 720. Modem 710 is connected to computer system 720 over connection 140: alternate embodiments feature modem 710 as connected internally to computer system 720 and as externally connected to computer system 720. Modena 710 is connected to standard telephone line service 130 over telephone line 120.

Figure 8:
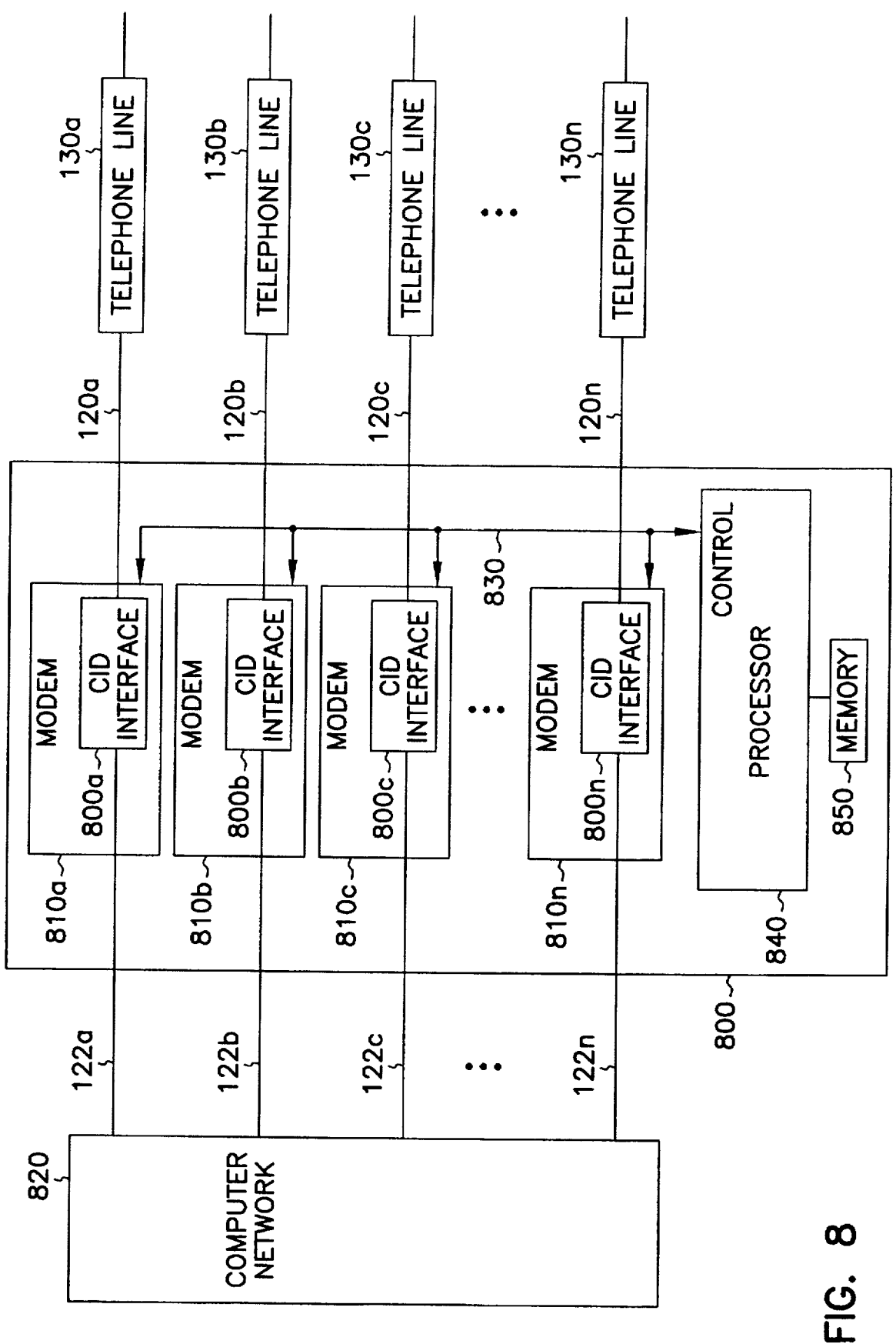
FIG. 8 is a general block diagram of one embodiment of the present invention showing a plurality of modems with internal caller ID interfaces for connecting a computer network to the plurality of standard telephone line services.

Another embodiment of an internal caller ID interface 800 according to the present invention is shown in FIG. 8 in which a plurality of modems 810a–810n with internal caller ID interfaces 800a–800n, respectively, are used to connect standard telephone line services 130a–130n to computer network 820. Telephone lines 120a–120n interconnect modems 810a–810n to standard telephone services 130a–130n. and connections 122a–122n connect modems 810a–810n to computer network 820. In one embodiment modems 810a–810n are internally installed in computer network 820. In an alternate embodiment, modems 810a–810n are external to computer network 820.

In one embodiment processor 840 controls the plurality of data modems 810a–810n using processor interface 830 in order to provide an integrated modem with caller ID interface system 800. In one embodiment, processor 840 programs an independent access matrix for caller ID interfaces 800a–800n. In another embodiment caller ID interfaces 800a–800n are identically programmed with a single access matrix to function identically to incoming calls. Alternate embodiments use memory 850 as storage for the preprogrammed access matrix. In an alternate embodiment, processor 840 and memory 850 are located in each modem 810a–810n. Another embodiment creates a database by storing caller ID information decoded from incoming calls in memory 850.

Figure 9:
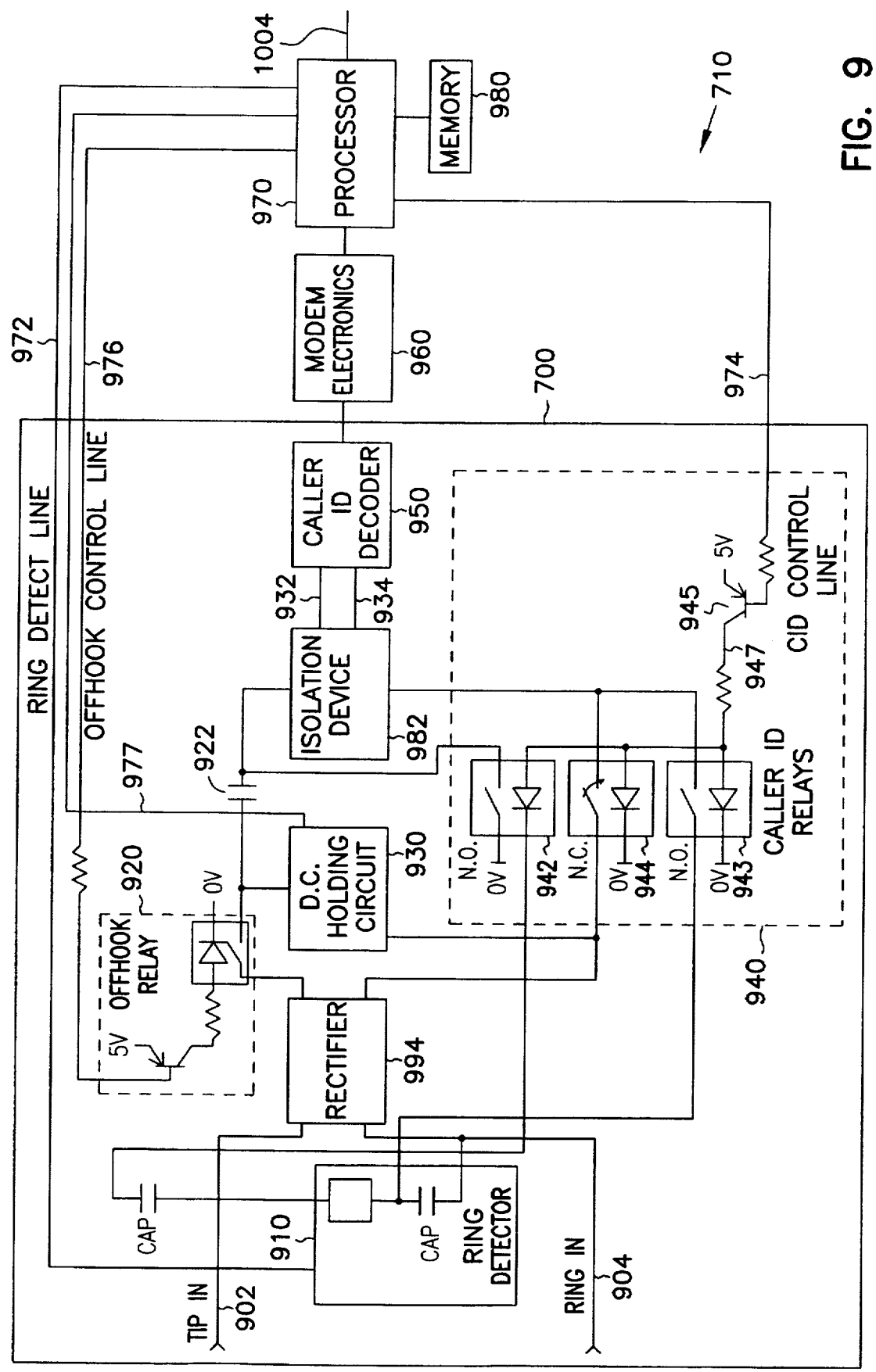
FIG. 9 is a schematic diagram showing one embodiment of an internal caller ID interface for a modem.

FIG. 9 shows one embodiment of the modem with internal caller ID interface 710 as shown in FIG. 7. Internal caller ID interface 700 includes ring detector 910, off-hook circuit 920, DC holding circuit 930, caller ID relays 940, caller ID decoder 950, processor 970, and memory 980. Alternate embodiments will reduce duplicity in circuitry by using existing ring detector, off-hook, and DC holding circuits found in modem designs, and add caller ID relays 940, caller ID decoder 950, and appropriate signal lines to realize the internal caller ID interface 700. In other embodiments processor 970 is the modem processor and memory 980 is a portion of memory in the modem.

Ring detector 910 signals processor 970 on signal line 972 when an incoming call is received on telephone lines 902 and 904. Processor 970 signals caller ID relays 940 on signal line 974 to decode the caller ID information as transmitted by the telephone company between the first and second telephone rings. Caller ID relays 940 route signals on telephone lines 902 and 904 to caller ID decoder 950 via isolation device 982 when signal 974 is pulled to a logic "0" state. When signal 974 is logic low, transistor 945 conducts and normally open optoisolated relays 942 and 943 close briefly while normally closed optoisolated relay 944 opens. The switching period only needs to be long enough to receive the frequency shift keying caller ID transmissions between the first and second telephone rings. Rectifier 994 ensures that the telephone line polarity to the dc holding circuit 930 is consistent regardless of the polarity of the telephone service connections to lines 902 and 904. Isolation device 982 electrically isolates the caller ID interface 700 from the modem electronics 960. Isolation device 982 is typically a transformer, however, alternate embodiments employ an optocoupler device.

If the incoming caller ID information and the access matrix parameters indicate that the caller is authorized, then processor 970 answers the telephone call by asserting a logic "0" on line 976 to activate off-hook relay circuit 920 and engaging the telephone current loop using signal 977 to activate DC holding circuit 930. When these circuits are activated caller ID relays 940 are programmed to pass telephone signals 932 and 934 through caller ID decoder 950 to modem electronics 960 for demodulation and data processing.

If the caller is not authorized access, the caller ID interface 700 hangs up on the caller by momentarily taking the modem off-hook and returning to on-hook by toggling signal line 976. In this way, the caller ID interface hangs up on an unwanted caller without providing access to the caller. An alternate embodiment transmits a message to the unauthorized caller prior to hanging up on the caller.

It is feasible that the circuit shown in FIG. 6 could be used to realize caller ID interface 700 in FIG. 7, however, this embodiment is offered to show one modification of existing modem electronics to perform caller ID demodulation and decoding.

In one embodiment, caller ID decoder 950 is the Mitel MT8841 Calling Number Identification Circuit as specified in the Mitel Microelectronics Digital/Analog Communications Handbook, which was incorporated by reference above. Processor 970 is the Zilog Z182 Microprocessor as specified in the Z180 Family Microprocessors and Peripherals Databook, which was also incorporated by reference above. Those skilled in the art will readily recognize that other caller ID decoders and processors may be used without departing from the scope and spirit of the present invention. Alternate embodiments may use sophisticated, multifunction decoding devices and data pumps to perform the functions of caller ID decoder 950. Additionally, processor 970 may be replaced with combinational logic to control the operation of the caller ID interface.

An alternate embodiment of the present invention uses communications port 1004 of processor 970 to provide a plurality of modems 810a–810n shown in FIG. 8. For a plurality of modems processor 970 and memory 980 of FIG. 9 are included in each modem 810a–810n. In this embodiment, communications port 1004 provides a means for remote configuration of internal caller ID interface 800a–800n or simultaneous programming of other commonly connected caller ID interfaces 800 as shown in FIG. 8. A personal computer serves as processor 840 and memory 850 to record and process statistical caller information and program access matrices. An alternate embodiment utilizes a single processor 970 and memory 980, which equates to processor 840 and memory 850 in FIG. 8, to control each caller ID interface 800a–800n in the plurality of modems 810a–810n.

Figure 10:
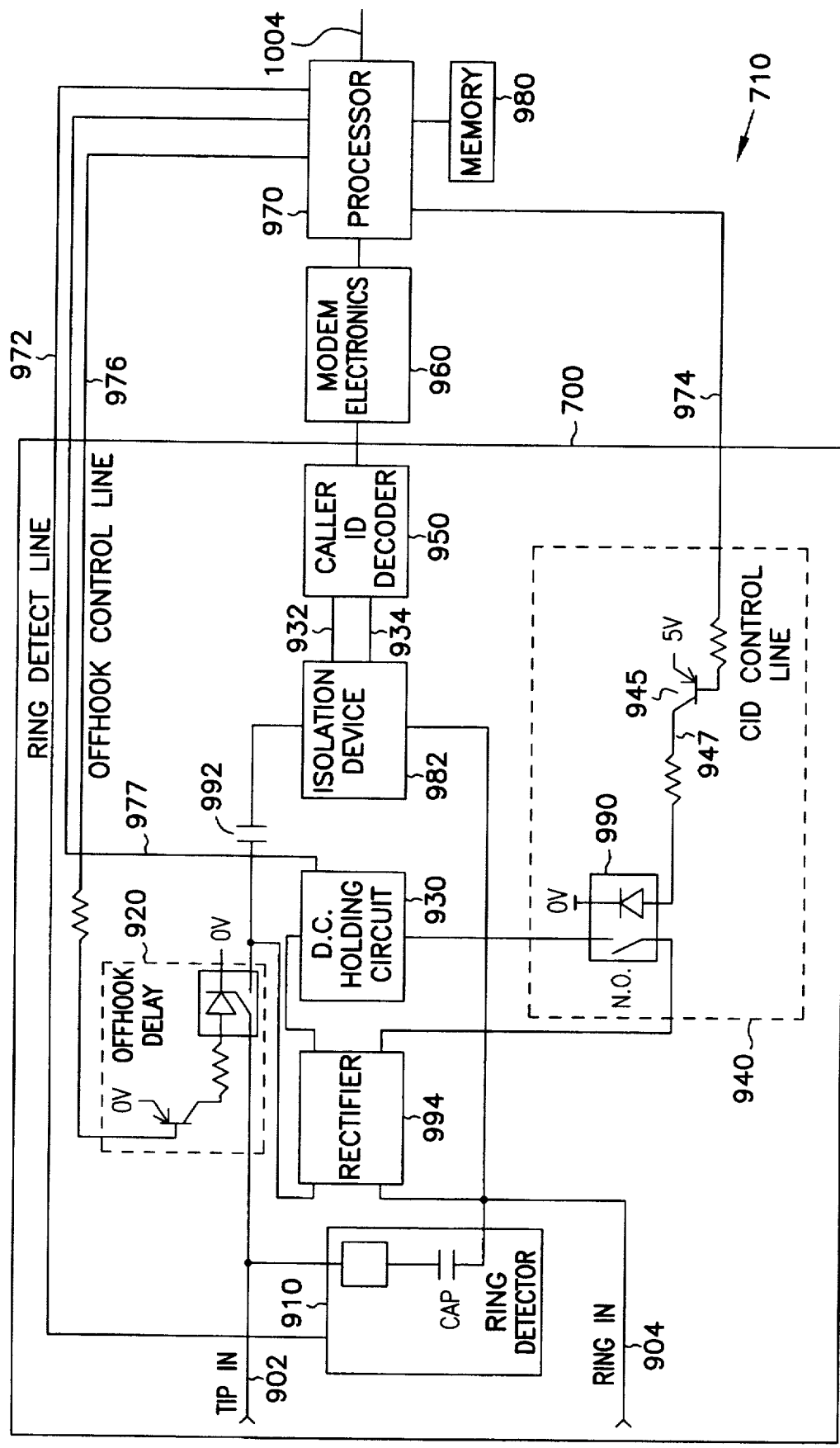
FIG. 10 is a schematic diagram showing one embodiment of an internal caller ID interface for a modem.

An alternative embodiment of the caller ID interface 700 is shown in FIG. 10. The operation of caller ID interface 700 shown in FIG. 10 is similar to the caller ID interface of FIG. 9, except that this embodiment of the caller ID interface 700 requires only a single relay 990 (instead of the three relays 942, 944, and 943 of FIG. 9) to activate dc holding circuit 930 for purposes of answering the telephone call. The on-hook condition of caller ID interface 700 is characterized by off-hook relay 920 (normally open) being open and relay 990 (normally closed) being open. The caller ID information from telephone lines 902 and 904 is decoded after the first ring by closing off-hook relay 920 to pass the frequency shift keying caller ID signals through capacitor 992 to caller ID decoder 950. Therefore capacitor 992 serves as a dc blocking element to create an ac path to caller ID decoder 950. Closing off-hook relay 920 connects the ac loop for frequency shift keying demodulation and decoding and the call is not answered as long as relay 990 remains open. If the caller ID information indicates an authorized caller, then closing relay 990 creates the off-hook condition for connecting the caller to the modem 710. If the caller ID information in conjunction with the access matrix indicates that the caller is unauthorized a quick hang up can be accomplished by briefly toggling relay 990 and off-hook relay 920 to answer the call and then hang up.

Those skilled in the art will readily recognize that other caller ID decoders and processors may be used without departing from the scope and spirit of the present invention. Alternate embodiments use sophisticated, multifunction decoding devices and data pumps to perform the functions of caller ID decoder 950. Additionally, processor 970 may be replaced with combinational logic to control the operation of the caller ID interface. Finally, alternate relay switching embodiments may be constructed which do not depart from the scope and spirit of the present invention.

Caller ID Encoded Transmissions

In standard telephone caller ID systems the caller ID information is transmitted between the first and second telephone ring. The caller ID information includes a message-type byte, a length byte, and data bytes consisting of date, time, telephone number with area code, telephone owner's name, and check sum byte and is sent using frequency shift keying between the first and second ring. Several industry protocols for caller ID are being developed by telecommunications vendors, including:

1. Bellcore's single data message frame format and multiple data message frame format as described in Bellcore Technical Reference TR-NWT-000030, Issue Oct. 2, 1992, which is hereby incorporated by reference;
2. Rockwell's Calling Number Delivery (CND) as described in Rockwell Application Note, Document No. 29800N73, Order No. 873, October 1991, which is hereby incorporated by reference; and
3. AT&T's Caller ID as described in the AT&T Microelectronics Modem Designer's Guide, Jun. 3, 1993, Doc. MN92-026DMOS, which is hereby incorporated by reference.

Figure 11:
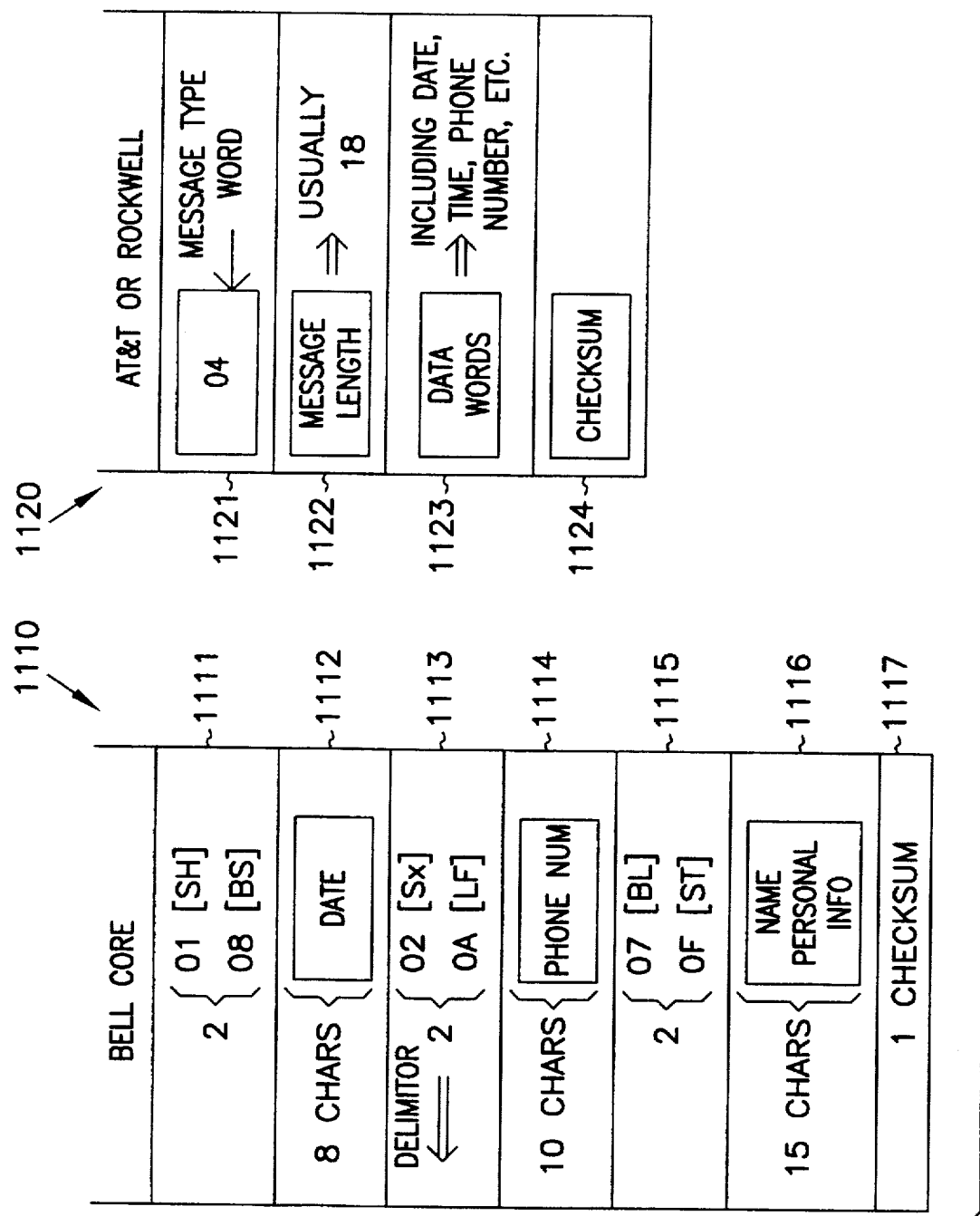
FIG. 11 is a block diagram showing the multiple data message format and single data message format used in standard caller ID encoded transmissions.

FIG. 11 summarizes the three caller ID protocols described above. The Bellcore multiple data message frame format 1110 is distinguished from the AT&T or Rockwell single data message frame format 1120 by examining the leading bytes 1111 (01 H) and 1121 (04H).

Figure 12:
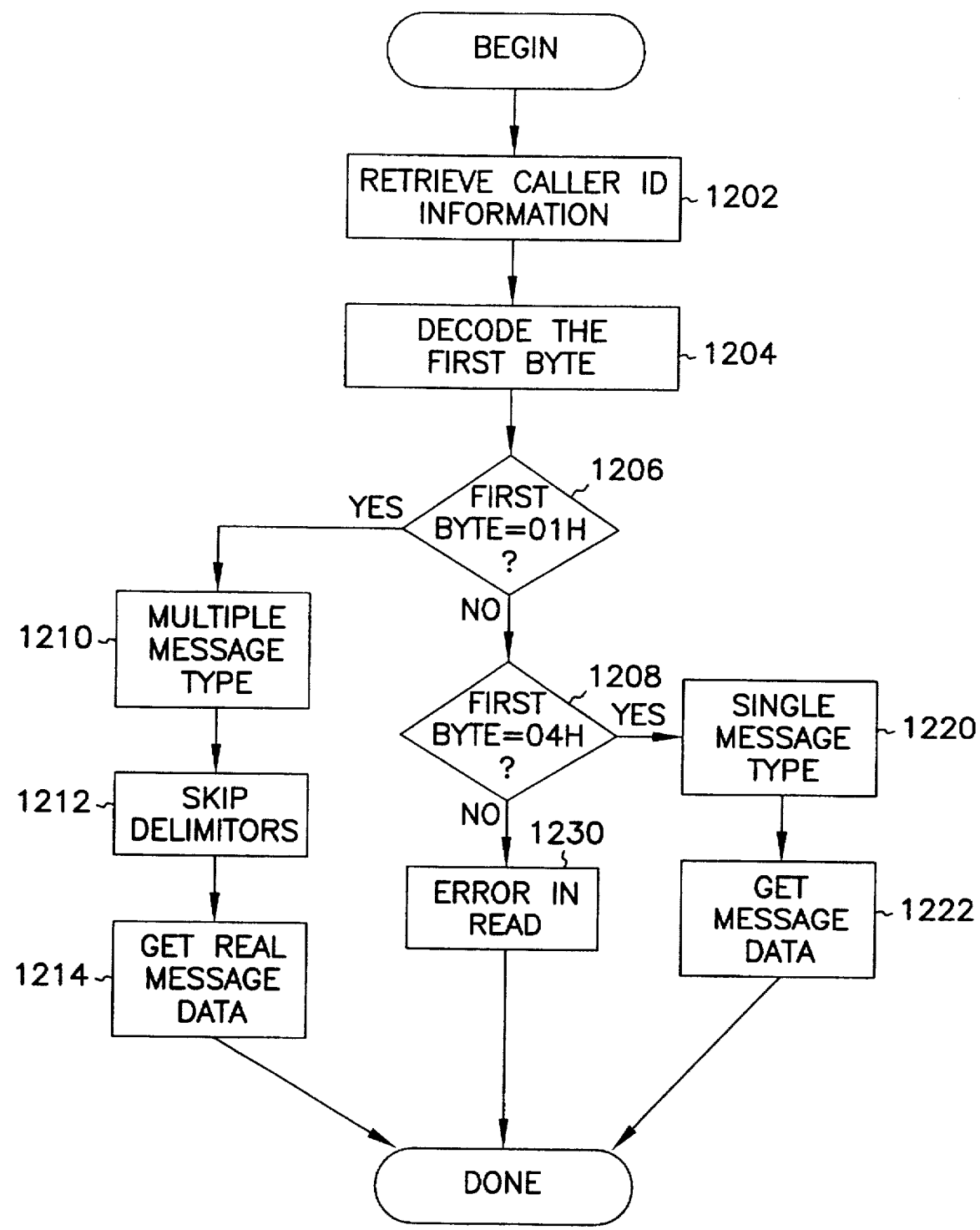
FIG. 12 is a flowchart showing one embodiment of a caller ID format recognition scheme.

FIG. 12 shows an algorithm which distinguishes between the different protocols for proper decoding of the incoming caller ID information in one embodiment of the present invention. The caller ID information is retrieved from the caller ID decoding hardware 1202 and the first byte is decoded to determine the message type 1204. If the first byte is 01H (1206), then the caller ID protocol is the multiple data message format 1110 of FIG. 11 (1210) and the message data is read after skipping the delimiters (1212, 1214). If the first byte is 04H (1208) then the caller ID information is in the single data message format 1120 of FIG. 11 (1220) and the message data can be read directly (1222). If the first byte is neither 01H or 04H, then the caller ID information is being transmitted by another protocol or an error has been made in the decoding or transmission 1230. Since the above mentioned protocols are the most widely used, the present algorithm provides for automatic switching between formats to ensure that both formats are properly read.

Those skilled in the art will readily recognize that the present invention can be modified to accommodate future caller ID message protocols without departing from the scope and spirit of the present invention, and that the protocols presented are not intended to be an exclusive or limited set of protocols for use with the present invention.

Quick Hang Feature

In one embodiment of the present invention the quick hang feature allows the modem to hang up immediately on an unwanted caller by placing the modem off hook for a duration of one second, and then place the modem back "on hook" again. The modem is then ready to accept another call. This feature minimizes the amount of time an invalid user can tie up a phone line. Other durations are possible without departing from the spirit and scope of the present invention.

Time of Day Synchronization Using Caller ID

In one embodiment of the present invention time synchronization is accomplished using the decoded caller ID information which identifies the time of day to synchronize an on-board time-of-day clock.

Call Screening Using Caller ID Information

Figure 13:
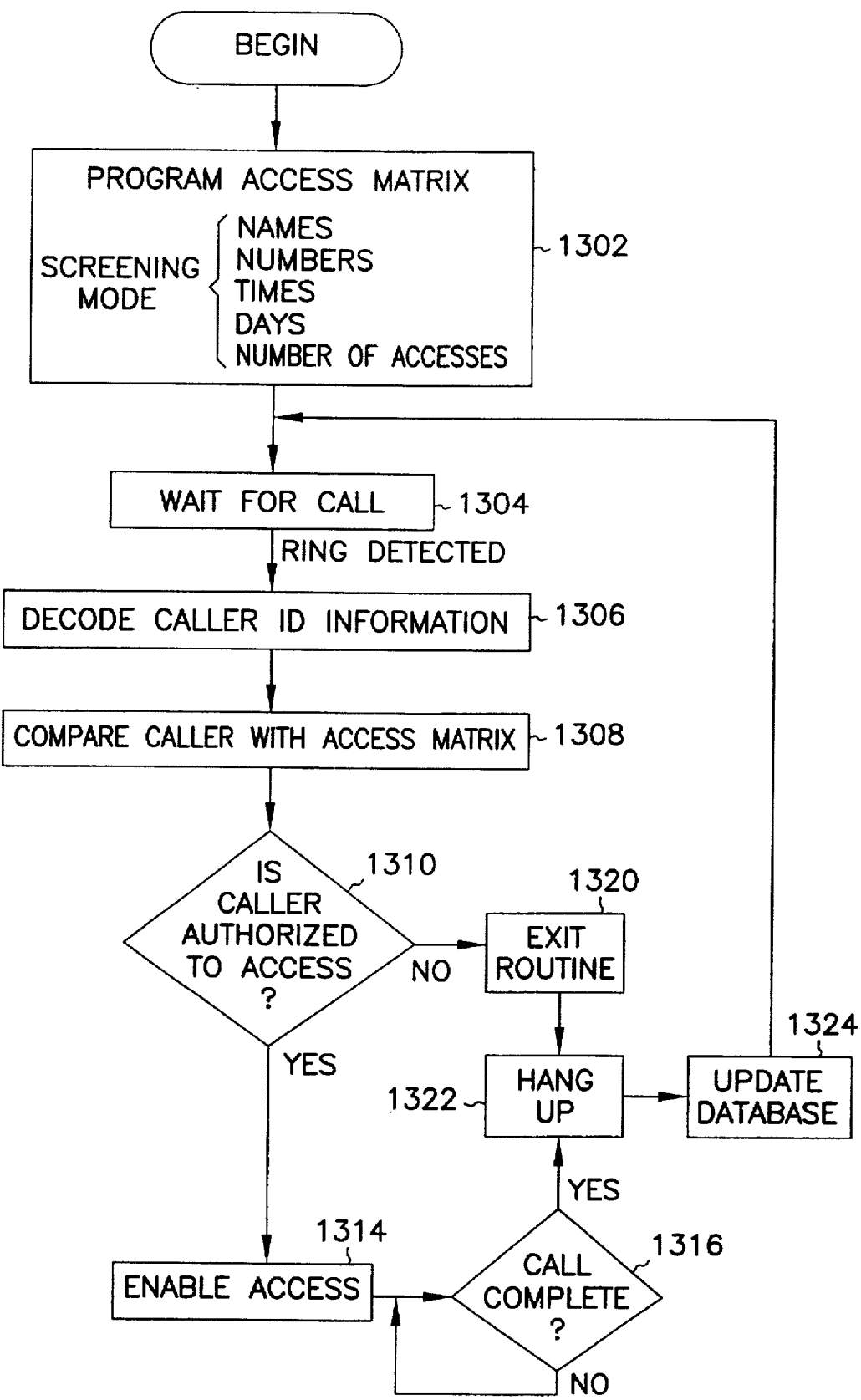
FIG. 13 is a flowchart of the general operation of one embodiment of the present invention.

The information available from decoding caller ID information allows the caller ID interface to screen users by a variety of parameters as specified in a preprogrammed access matrix. The flowchart shown in FIG. 13 describes the overall operation of the screening function. The program access matrix is programmed by specifying the screening mode and specifying the operative parameters to perform the screening, such as caller name, caller telephone number, time and day frames for receiving calls, and number of accesses (1302). In one embodiment of the present invention the receiving modem operates in the following modes or combination of modes which will be described further in the "Screening Modes Using Caller ID" section below:

1. Number Only Mode;
2. Blacklist Mode:
3. Day Only Mode;
4. Time Only Mode;
5. Name Only Mode;
6. S Register 50 Mode; and
7. Hybrid Modes The caller ID interface then detects a ring 1304, decodes the caller ID information 1306, and compares the caller ID information with the access matrix (a function of the screening mode, as described below) 1308, and determines whether the caller is authorized to access the modem 1310. If the caller is not authorized an exit routine is performed 1320 which may be a number of operations including, but not limited to, a friendly error message and a quick hang up 1322. If the modem is compiling a database of callers, the database can be updated with the received caller ID information 1324 before waiting for another call 1304. If the caller is authorized, access is enabled 1314 and allowed until the call is terminated 1316. The hang up procedure 1322 is followed by an database update 1324 before returning to the wait state for another call 1304. The step of determining whether access is authorized 1310 is discussed in detail in the below section on Screening Modes.

Screening Modes Using Caller ID

The following modes are used in one embodiment of the present invention to control access to a modem connected to the caller ID interface. The parameters of each mode become part of the preprogrammed access matrix. A number of examples will be offered following a brief description of the various modes of this embodiment:

Number Only Mode

In the number only mode, the modem compares an incoming caller ID number to phone numbers on a "number only" list. Only incoming calls with numbers matching the phone numbers on the list will be answered. The number list is part of the access matrix which is preprogrammed into the caller ID interface memory.

Blacklist Mode

In the blacklist mode, the modem compares an incoming caller ID number to a list of callers on a "blacklist." Any call which matches a phone number on the "blacklist" will be denied access to the device and the incoming call will be terminated immediately using a preprogrammed exit routine, such as the "quick-hang" feature described above. The blacklist and desired exit routine can be tailored depending on the particular blacklisted caller. For example, a BBS might want to quick hang up on a blacklisted abuser of the bulletin board, but only give a "late dues" message to a blacklisted user who is merely late in paying dues. The access matrix contains all of the blacklist parameters.

Day Only Mode

In the day only mode, the access matrix is programmed to authorize calls only on specific days.

Time Only Mode

In the time only mode, the modem only answers calls during a certain preprogrammed times of the day and ignores calls outside of those specified times. For example, this feature enhances the security to a computer network provided by the present invention during non-business hours.

Name Only Mode

The name only mode authorizes access only to callers whose names are preprogrammed in a name table in the access matrix. This is a means for inclusively authorizing access to the modem. (The blacklist mode is an exclusive means for authorizing access to the modem.)

S Register 50 Mode

The S Register 50 mode provides a limited number of accesses by a particular user. The access matrix is preprogrammed with a predetermined number of calls allowed to a user before that user is black listed. This feature is especially useful for electronic bulletin board service operators because it allows them to screen out unwanted users as soon as the S Register number is reached. The S Register mode also allows for limiting the number of accesses made by a new user of the bulletin board, since in one embodiment of the present invention a new user is assigned a position in the access matrix and subject to a maximum number of accesses, similar to the known users. This is known as a Temporary Blacklist mode, since after the predetermined number of accesses, the user is temporarily blacklisted until the access counter for that user is reset by the system administrator.

Hybrid Modes

Any combination of the above modes provides a specialized access matrix based on each listed user. For example, access authority can be limited to a particular caller name and at a particular time-of-day by programming a specific caller name and access times as demonstrated by the examples below.

Screening Mode Examples

Several access matrix examples for a BBS and their associated interpretations are described below for each entry in the table, according to one embodiment of the present invention.

TABLE 1

| | | BLACKLIST MODE | | |
|---|---|---|---|---|
| NUMBER | NAME | DAY/TIME | S50 | EXIT ROUTINE |
| (b) 333-3333 | (b) Mr. J | | | quick hang "Illegal Access" |

Table 1 shows two examples of the blacklist mode. Any caller from 333-3333 will receive a quick hang immediately on attempt to access the BBS modem. Additionally, any time Mr. J attempts to call (from any of his phones), the message "Illegal Access" will be displayed prior to hang up by the BBS.

TABLE 2

| | | NAME ONLY MODE | | |
|---|---|---|---|---|
| NUMBER | NAME | DAY/TIME | S50 | EXIT ROUTINE |
| | Mr. Z | | | |
| | Ms. B | | | |

Table 2 shows that only Mr. and Ms. B can access the BBS modem, regardless of telephone number or day.

TABLE 3

| | | NUMBER ONLY MODE | | |
|---|---|---|---|---|
| NUMBER | NAME | DAY/TIME | S50 | EXIT ROUTINE |
| 123-4567 | | | | |
| 676-8888 | | | | |

Table 3 shows that only callers from 123-4567 and 676-8888 can access the BBS modem, regardless of name or time of day.

TABLE 4

| | | TIME ONLY MODE | | |
|---|---|---|---|---|
| NUMBER | NAME | DAY/TIME | S50 | EXIT ROUTINE |
| | | /9-17 | | |

Table 4 shows that any caller between 9:00 a.m. and 5:00 p.m. can access the BBS modem (24 hour time format used in this example).

TABLE 5

| | | HYBRID MODES | | |
|---|---|---|---|---|
| NUMBER | NAME | DAY/TIME | S50 | EXIT ROUTINE |
| 333-3333 | Mr. A | M–W/6–13, 14–15 | 5 | quick hang |
| 444-4444 | Ms. B | ALL/9–17 | | |
| 555-5555 | | M–F/9–17 | 10 | "PAY DUES" |
| | Mr. C | M–W/ | 3 | |

Table 5 provides four examples of access matrix entries. In the first line, Mr A. can access the BBS modem from Monday to Wednesday and at the times of 6:00 a.m. to 1:00 p.m. and 2:00 p.m. to 3:00 p.m. Mr. A can only access the BBS modem five (5) times before access is denied and the system administrator is notified. Mr. A will get a quick hang up on his sixth attempt to access the BBS modem, and attempts thereafter, until his access register is reset by the system administrator.

Ms. B can access the BBS modem all days of the week, but only between the hours of 9:00 a.m. to 5:00 p.m. Ms. B can access the BBS modem an unlimited number of times.

Any caller from phone number 555-5555 can access the BBS modem from Monday to Friday between the hours of 9:00 a.m. to 5:00 p.m. A "Pay Dues" message will be displayed to the user before a hang up on the eleventh attempt to access the BBS modem, and subsequent attempted accesses. The system administrator must reset the access counter for future access authorization.

Mr. C can access the BBS modem from any of his phone numbers, and can access at any time on Monday through Wednesday. After three accesses, Mr. C's exit routine will be whatever the default exit routine for the BBS happens to be.

The described screening modes are not limiting and not exclusive. One skilled in the art would readily recognize that other modes and variations of these modes are possible without departing from the scope and spirit of the present invention.

One Embodiment of the Screening Algorithm

The previously described screening modes are not exclusive or limiting to the present invention. Neither is the particular interaction of the screening modes. The following is only one embodiment of a screening algorithm offered to demonstrate the interaction between screening modes in one embodiment of the present invention.

Figure 14:
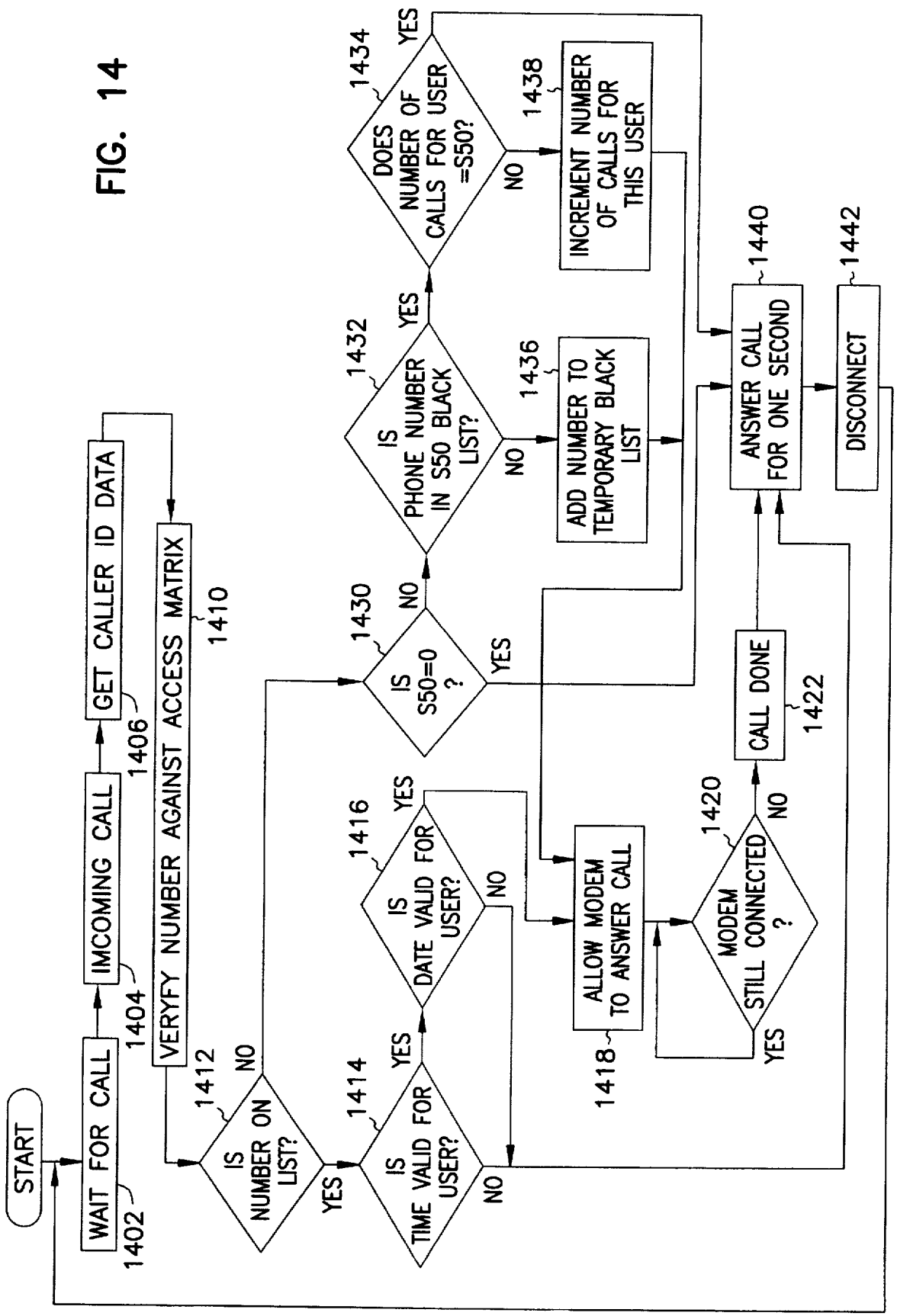
FIG. 14 is a flowchart showing one possible implementation of a screening mode algorithm.

FIG. 14 illustrates one embodiment of the authorization process using the above described screening modes. The caller ID interface waits for a call 1402, and gets the caller ID information upon detecting an incoming call 1404, 1406. The caller ID information is verified against the access matrix, in this example the caller's telephone number is verified 1410, 1412. If the number is on the list, then the time of day is verified 1414 and the date is verified 1416 before the modem is allowed to answer the call 1418. The modem is engaged in the call as long as it is connected 1420 and the call is complete after the connection is lost 1422. The modem then quick hangs up 1440 and disconnects 1442 before waiting for the next call 1402. If the time of day or date is invalid the quick hang procedure is automatically initiated. If the telephone number is not on the number list 1410 the user's number of accesses is checked to ensure that the maximum is not exceeded 1430 and if the number is not on the temporary blacklist 1432 it is added 1436 prior to answering the call 1418. If the number is on the blacklist 1432, a separate S Register 50 for the blacklist is checked 1434 and quick hang is initiated 1440, 1442 if the maximum number of accesses is exceeded, else the register for this caller is incremented 1438 and the call answered 1418, 1420, and 1422. The quick hang procedure, 1440 and 1442, is again followed by waiting for the next call 1402.

CONCLUSION

The present invention was described in terms of a modem interface, however, the methods and apparatus are applicable to a number of data exchange devices. For example, the present invention is adaptable to any system with caller identification information, including, but not limited to applications in the fiber superhighway and similar applications.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and equivalents thereof.

We claim:

1. A modem access control device, comprising:

first port means, connected to a communications line, for transceiving information between the access control device and the communications line;

processing means for processing access information;

data storage means, connected to the processing means, for access information storage;

caller identification decoding means, connected to the first port means and the processing means, for decoding caller identification information;

second port means, connected to a communications device and to the first port means, for transceiving information between the access control device and the communications device; and quick hang up means, connected to the first port means and the processing means, for disconnecting an unwanted caller before communicating with the communications device upon command from the processing means.

2. A modem access control device of claim 1 wherein the modem access control device is preprogrammed with access information for identifying an unwanted caller.

3. The modem access control device of claim 1 wherein the data storage means includes means for storing caller telephone number, caller name, time of day, date, and number of calls.

4. The modem access control device of claim 2 wherein the access information comprises caller identification information including caller telephone number, caller name, time of day, and date.

5. A method for controlling access to a modem, comprising the steps of:

preprogramming a memory device with access parameters;

detecting a telephone call;

receiving caller identification information;

decoding the caller identification information;

comparing the caller identification information with the access parameters to determine whether access is authorized;

if the access is unauthorized, answering and hanging up the telephone line prior to access of the modem; and if the access is authorized, enabling a connection to the modem.

6. The method of claim 5, wherein the step of preprogramming further comprises the step of programming a list of names of authorized caller names.

7. The method of claim 5, wherein the step of preprogramming further comprises the step of programming a list of authorized caller telephone numbers.

8. The method of claim 5, wherein the step of preprogramming further comprises the step of programming a list of authorized times of day to call.

9. The method of claim 5, wherein the step of reprogramming further comprises the step of programming a list of authorized days to call.

10. The method of claim 5, wherein the step of preprogramming further comprises the step of programming a list of authorized caller names, days and times of day to call.

11. The method of claim 5, wherein the step of preprogramming further comprises the step of programming a list of authorized caller telephone numbers, days and times of day to call.

12. The method of claim 5, wherein the step of preprogramming further comprises the step of programming a list of unauthorized caller names.

13. The method of claim 5, wherein the step of preprogramming further comprises the step of programming a list of unauthorized caller numbers.

14. An interface for connecting a modem to a telephone line, comprising:

a telephone input port for receiving telephone signals into the interface;

a ring detector, connected to the telephone input port, for detecting incoming calls;

a quick hang up circuit, connected to the telephone input port, for disconnecting unauthorized callers prior to accessing the modem;

a telephone output port for transmitting telephone signals to the modem;

a caller identification decoder, connected to the output port, for decoding caller identification information;

a controller, connected to the ring detector, quick hang up circuit, and caller identification decoder, for controlling the interface and for comparing the caller identification information to an access matrix for authorization purposes;

a memory device, connected to the controller, for storing the access matrix;

a pass through circuit, connected to the controller, for interconnecting the telephone input port to the telephone output port upon controller command;

an in-use detector, connected to the telephone output port and the controller, for detecting a connection between the telephone line and the modem.

15. The apparatus of claim 14 wherein the controller comprises a processor.

16. The apparatus of claim 14 wherein the controller comprises combinational logic.

17. An internal modem interface, connected to a telephone line, for screening incoming telephone calls to modem electronics, the internal modem interface comprising:

a telephone input port for receiving telephone signals into the interface;

a ring detector, connected to the telephone input port, for detecting the incoming call;

an off-hook circuit, connected to the telephone input port, for connecting the modem interface to the telephone line;

a dc holding circuit, connected to the off-hook circuit and the input port, for maintaining a connection with the incoming telephone calls;

a decoder for decoding caller identification information and modem data;

a pass through circuit, connecting the decoder to the telephone input port and the dc holding circuit, for selecting the telephone signals from the telephone input port for caller identification information decoding and from the dc holding circuit for modem data decoding;

a controller, connected to the ring detector, off-hook circuit, dc holding circuit, pass through circuit, and decoder, for controlling the internal modem interface and for comparing the caller identification to an access matrix for authorization purposes; and a memory device, connected to the controller, for storing the access matrix, wherein the caller identification information from a telephone call is compared to the access matrix to determine if a caller is unauthorized to access the modem electronics and, if the caller is unauthorized, disconnecting the caller prior to enabling access to the modem by momentarily toggling the off-hook circuit.

\* \* \* \* \*